US006954358B2

(12) United States Patent
King et al.

(10) Patent No.: US 6,954,358 B2
(45) Date of Patent: Oct. 11, 2005

(54) COMPUTER ASSEMBLY

(75) Inventors: James Edward King, Wokingham (GB); Rhod James Jones, Crowthorne (GB)

(73) Assignee: Sun Microsystems, Inc., Santa Clara, CA (US)

( * ) Notice: Subject to any disclaimer, the term of this patent is extended or adjusted under 35 U.S.C. 154(b) by 420 days.

(21) Appl. No.: 10/216,536

(22) Filed: Aug. 9, 2002

(65) Prior Publication Data

US 2004/0030413 A1 Feb. 12, 2004

(51) Int. Cl.⁷ ................................................ G06F 1/20
(52) U.S. Cl. ................. 361/687; 165/104.33; 713/322; 710/300; 702/132
(58) Field of Search ........................ 361/683, 724–727, 361/687; 165/104.33, 80.3; 415/177, 178; 713/300, 322–324; 710/300, 303; 714/47, 48; 307/117; 702/132

(56) References Cited

U.S. PATENT DOCUMENTS

| | | | | |
|---|---|---|---|---|
| 6,134,667 A | * | 10/2000 | Suzuki et al. ............... | 713/300 |
| 6,182,742 B1 | * | 2/2001 | Takahashi et al. ..... | 165/104.33 |
| 6,266,721 B1 | * | 7/2001 | Sheikh et al. ................ | 710/100 |
| 6,318,965 B1 | * | 11/2001 | Nair .............................. | 417/2 |
| 6,349,385 B1 | * | 2/2002 | Kaminski et al. ........... | 713/300 |
| 6,400,045 B1 | * | 6/2002 | Hosokawa et al. ......... | 307/117 |
| 6,414,843 B1 | * | 7/2002 | Takeda ........................ | 361/687 |
| 6,470,289 B1 | * | 10/2002 | Peters et al. ................ | 702/132 |
| 6,493,827 B1 | * | 12/2002 | Mueller et al. ............. | 713/300 |
| 6,813,150 B2 | * | 11/2004 | King et al. .................. | 361/687 |
| 2002/0042896 A1 | * | 4/2002 | Johnson et al. ............... | 714/47 |
| 2003/0023887 A1 | * | 1/2003 | Maciorowski et al. ...... | 713/300 |

* cited by examiner

*Primary Examiner*—Lisa Lea-Edmonds
(74) *Attorney, Agent, or Firm*—Meyertons Hood Kivlin Kowert & Goetzel, P.C.; B. Noël Kivlin

(57) ABSTRACT

A computer system comprises a host processor, and a service processor for providing system management functions within the computer system. One or more external communication devices are provided, for example ethernet ports. The external communication devices include at least one management communication device that communicates with the service processor. The management communication device is controlled by a signal from the service processor and is operative to send and receive data only when it receives the signal from the service processor.

16 Claims, 5 Drawing Sheets

COMPUTER ASSEMBLY

BACKGROUND OF THE INVENTION

This invention relates to computer systems, and especially to computer systems that are employed as servers.

The systems may for instance be employed as servers for example in local area networks (LANS) or in wide area networks (WANs), telecommunications systems or other operations such as database management or as internet servers. Such servers may be used in so-called "horizontally scaled" applications in which tens or hundreds of corresponding servers are employed as part of a distributed system.

A typical computer employed for such purposes will comprise two or more processors mounted on a motherboard, together with power supply units (PSUs), and other components such as hard disc drives (HDDs), fans, digital video disc (DVD) players, memory modules, ethernet ports etc. One or more of the processors, the host processor (s), provides the main functions of the server, and may communicate with various internal parts of the system via a console interface. In addition, the or each host processor will communicate with a number of peripheral components, including communication ports, optionally via peripheral component interconnect (PCI) bridges in order to provide server operation.

In addition to the host processor(s), the system may include another processor, called the service processor or the remote management controller (RMC), which provides management functions for the system assembly. Such functions may include environmental monitoring, temperature monitoring of the enclosure, fan speed control, data logging and the like. The service processor may communicate with the host processor or with one of them, and may also have one or more external communication ports so that a user or network administrator can communicate with the service processor, or can communicate with the host processor(s) via the service processor. For example, the service processor may have its own ethernet network port for direct communication to the network administrator.

Such ethernet network ports, whether communicating with the service processor or the host processor(s) will normally need a physical interface (PHY) in order to clean the signals and to provide power for driving the signals along the ethernet cabling, clock timing, line coding etc. The signals will then typically be sent to the ethernet cabling via a standard network port, for example an RJ45 port which will accept an eight line cable and is provided with a pair of light emitting diode (LED) indicators, one for indicating the existence of a link, and the other for indicating the existence of traffic on the line.

If there is any malfunction of the service processor whether due to hardware or software faults, the system is designed to continue to operate, at least as far as the provision of services provided by the host processor are concerned, although clearly system management services will no longer be available until the service processor is replaced in the event of a hardware failure. Thus, the functioning of the server should be largely unaffected by any failure of the service processor.

However, one problem may occur. Even though the service processor has stopped functioning, power will still be sent to all the ethernet interfaces including the service processor ethernet interface. While this will not matter as far as the ethernet interfaces handled by the host processors are concerned because those interfaces will still be controlled by their associated media access controllers (MACs) and host processors, no such control is exerted on the management interface controlled by the service processor. Thus, internal lines in the system extending between the service processor and the management PHY may be susceptible to interference from any active components in the system, and in particular from the host processor(s). This interference will then be amplified and line coded by the management PHY before being sent to the ethernet lines visual inspection of the RJ45 management port will give the appearance that the server is functioning correctly because the LEDs will be on indicating traffic on the line, even though this traffic is simply interference, and the server will appear to accept data from the service administrator because the RJ45 port is still operational.

SUMMARY OF THE INVENTION

According to one aspect of the present invention, there is provided a computer system which comprises:

(i) a host processor;
(ii) a service processor for providing system management functions within the computer system; and
(iii) one or more external communication devices, the external communication devices including at least one management communication device that communicates with the service processor;

wherein the management communication device is controlled by a signal from the service processor and is operative to send and receive data only when it receives the signal from the service processor.

The system according to the invention has the advantage that, in the event of a malfunction of the service processor, the system will still function for its intended purpose, other than to allow system management operations, but interference that is internally generated will not be put onto the external communication lines by the management communication device. For example, where the system operates as a network server, interference will not be put onto the network.

The signal may, for example, simply be a voltage level that is supplied by the service processor (optionally inverted). In such a case, a pull-up or pull-down resistor may be provided between the signal line and either a voltage rail or earth so that, the signal on the control line will be as supplied by the service processor unless and until the service processor fails, in which case the voltage on the line will be governed by the pull-up or pull-down resistor.

The management communication device may include a physical interface for providing line power, line coding and the like, in which case it may be provided with a reset input. The signal from the service processor may thus be sent to the reset input of the physical interface, after inverting if necessary depending on the reset input of the physical interface, in order to cause the physical interface to become inoperative if the service processor malfunctions.

The management communication device need not be the only external communication device in the computer system, and additional external communication devices, for example ethernet ports, may be provided that are controlled by the host processor(s). These devices will not be affected by a malfunction of the service processor, and will continue to operate as normal. There will not normally be a danger of such devices placing interference on the network because they will continue to be controlled by their processors and by their associated hardware such as the media access controllers.

According to another aspect of the invention, there is provided a network which includes at least one computer server comprising:
(i) a host processor;
(ii) a service processor for providing system management functions within the computer system; and
(iii) one or more external communication devices, the external communication devices including at least one management communication device that communicates with the service processor and with a network administrator; wherein the management communication device is controlled by a signal from the service processor and is operative to send and receive data only when it receives the signal from the service processor.

The network could be a private network, or it could be a public network. Where the network is a public network, the public will only have access to the information on the lines other than the network management line supplied by the management communication device. Accordingly, the public will not be aware of any malfunction of the service processor of the network server. This will only be apparent to the network administrator, who will attend to resolving the problem.

Thus, according to yet another aspect of the invention, there is provided a method of operating a network which includes at least one computer server comprising:
(i) a host processor;
(ii) a service processor for providing system management functions within the computer system; and
(iii) one or more external communication devices, the external communication devices including at least one management communication device that communicates with the service processor and with a network administrator; the management communication device being controlled by a signal from the service processor and being operative to send and receive data only when it receives the signal from the service processor, which method comprises monitoring traffic from the management communication device and effecting repair or replacement of the service processor or of the server in the event of loss of traffic from the management communication device.

BRIEF DESCRIPTION OF THE DRAWINGS

Embodiments of the present invention will now be described in detail by way of example with reference to the accompanying drawings, in which corresponding parts are given like reference numbers. In the drawings.

DESCRIPTION OF PARTICULAR EMBODIMENTS

Figure 1:
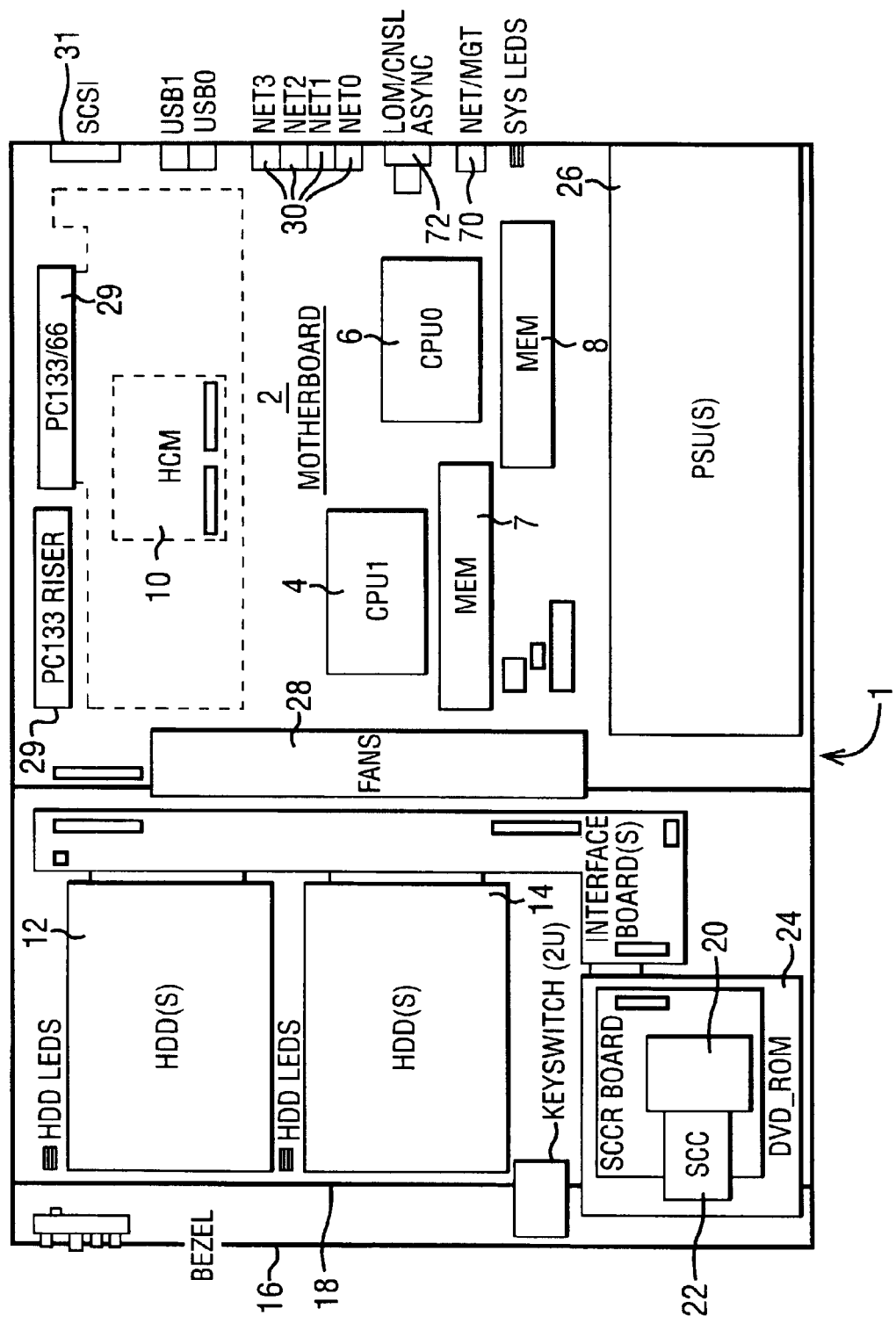
FIG. 1 is a physical plan view of one form of computer system according to the present invention.

Referring now to the drawings, in which like reference numerals are used to designate corresponding elements, FIG. 1 shows a physical plan view of a narrow form factor computer that is intended to provide a rack mounted server for use with the internet or as part of a local area network (LAN) or for other telecommunications purposes, and is designed to fit into, for example a nineteen inch rack electronics cabinet. Other sizes may alternatively be employed, for example to fit into 23 inch or metric racks. The assembly may be designed to be a so-called high "RAS" system, that is to say, to have high reliability, availability and serviceability. As such, it is intended that the system will be operated with the minimum amount of down time.

The computer comprises an enclosure 1 that contains a motherboard 2 in the form of a printed circuit board (PCB) designed in a custom form-factor to fit the enclosure 1 and chosen to minimise the cabling withing the enclosure. The motherboard 2 carries the majority of circuitry within the computer. On the motherboard are mounted one or more (in this case two) host processors or central processing units (CPUs) each of which is provided with its own dedicated cooling in the form of an impingement fan that clips onto the CPU socket. Each processor 4, 6 is provided with its own dedicated block of memory 7, 8, for example provided in the form of one or two banks of dual in-line memory modules (DIMMs) with a total of 256 MB to 16 GB block capacity although other forms and sizes may be used.

A hardware cryptographic module (HCM) 10 may also be located on the motherboard. The HCM may be provided on a mezzanine card which plugs directly into the motherboard, and contains a co-processor providing cryptographic protocol acceleration support for security algorithms used in private community applications.

Two hard disc drives (HDDs) 12 and 14 are located at the front of the computer behind the front bezel 16. The drives are hot-pluggable and are accessible by removal of the bezel and EMI shield 18. Two internal HDDs plug directly into the motherboard via right-angled connectors located on the front edge of the motherboard 2.

Next to the HDDs is arranged a system configuration card reader (SCCR) 20 that is able to read a system configuration card (SCC) 22 inserted therein. The SCC contains all relevant information concerning the computer, so that it is possible to replace one computer with another simply by inserting the original SCC into the new computer and replacing the hard disc drives with those of the original computer.

A removable media drive bay is provided to allow optional fitting of a slimline (notebook style) digital video disc or digital versatile disc (DVD) drive 24 for reading CD and DVD media. The media transport loader is accessible through a slot in the enclosure bezel 16.

One or two 320W or 400W custom power supply units (PSUs) 26 are also provided. In addition to the dedicated CPU fans, the assembly is cooled by means of a row of fans 28 mounted between the motherboard and the media drive bays.

The computer supports input/output (I/O) expansion by means of peripheral component interconnect (PCI) cards that plug into expansion slots. These are accommodated by means of riser cards 29 that plug directly into the motherboard 2.

A number of I/O interfaces and sockets are provided along the rear surface of the enclosure 1, including four ethernet ports 30, a network management ethernet port 70, and a serial port 72. The network management ethernet port 70 and the serial port 72 allow user access to the service processor and system console.

Figure 2:
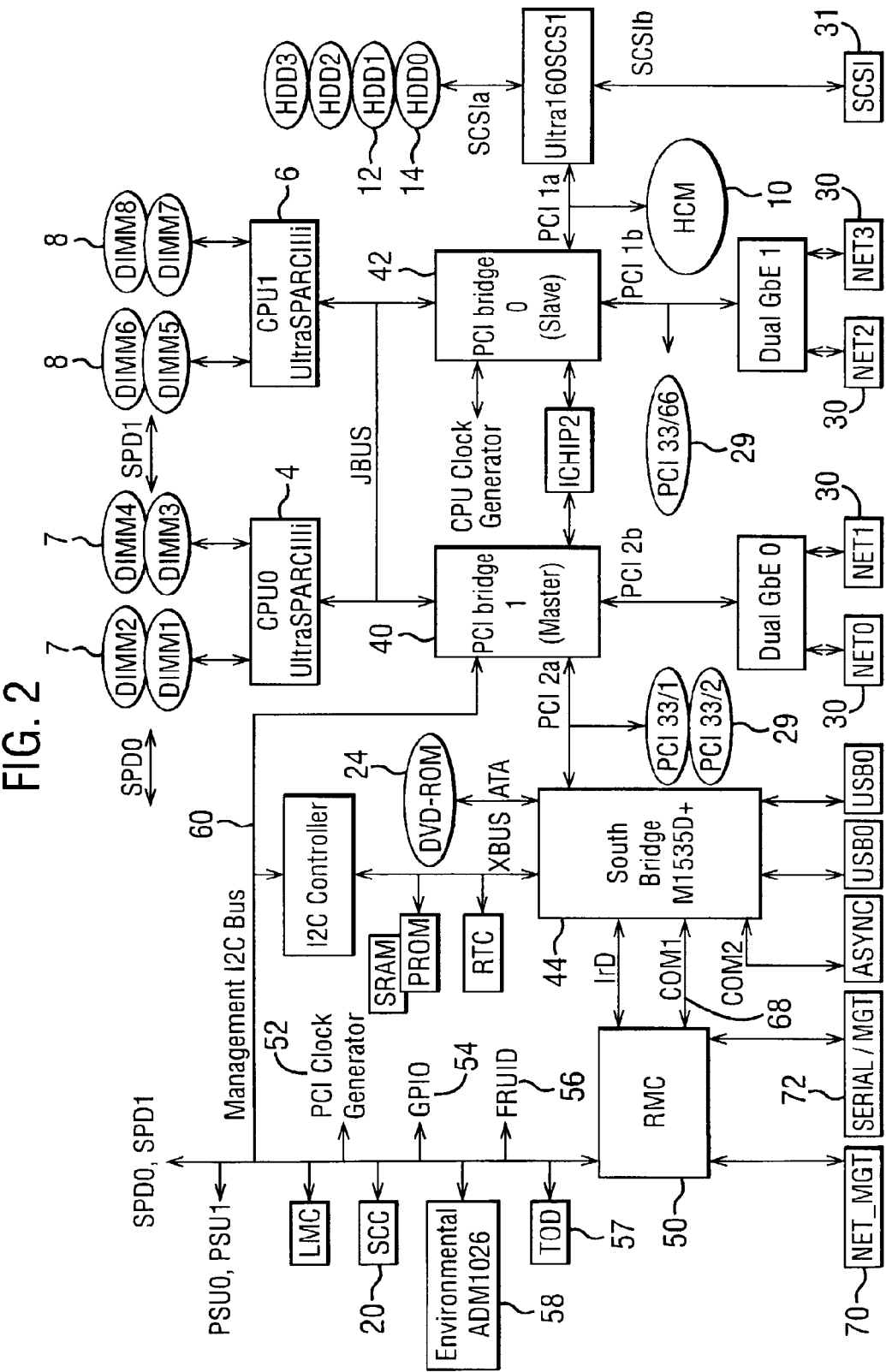
FIG. 2 is a schematic block diagram showing the system architecture of the system of FIG. 1.

FIG. 2 is a schematic representation of the system architecture of the computer system according to the invention.

Two host processors or CPUs 4 and 6 available from Sun Microsystems under the name UltraSPARCIIIi have an integer execution unit, a floating point and graphics unit, 32 kB level 1 instruction cache, 64 kB level 1 data cache, 1 MB (256 k×32) level 2 data cache, a memory controller with error correction code (ECC) and a jalapeno bus (JBUS) interface controller. Four DIMM sockets 7 and 8 are associated with each CPU.

The CPUs 4, 6 are connected to two PCI bridges 40, 42 which provide interfaces to independent 64 bit PCI buses leading to various peripheral components such as the riser cards 28, HDDs 12 and 14, the HCM 10 etc. The PCI bridge 40 is also connected to a PCI I/O device 44 available from Acer Labs under the product code M1535D+ also referred to as "South Bridge". This is an integrated PCI sub system which provides an integrated drive electronics (IDE) controller, a universal serial bus (USB) controller, independent universal asynchronous receiver/transmitters (UARTs), XBUS bridge and a power management controller. The PCI I/O device 44 also provides the console interface for enabling user access to the host processors 4 and 6.

A service processor or remote management controller (RMC) 50 is included for providing local and remote management services. Such services may include one or more of the following system functions:
1) power management control,
2) environmental monitoring,
3) enclosure management and event logging
4) fan control,
5) voltage rail monitoring, and
6) system status monitoring.

Figure 3:
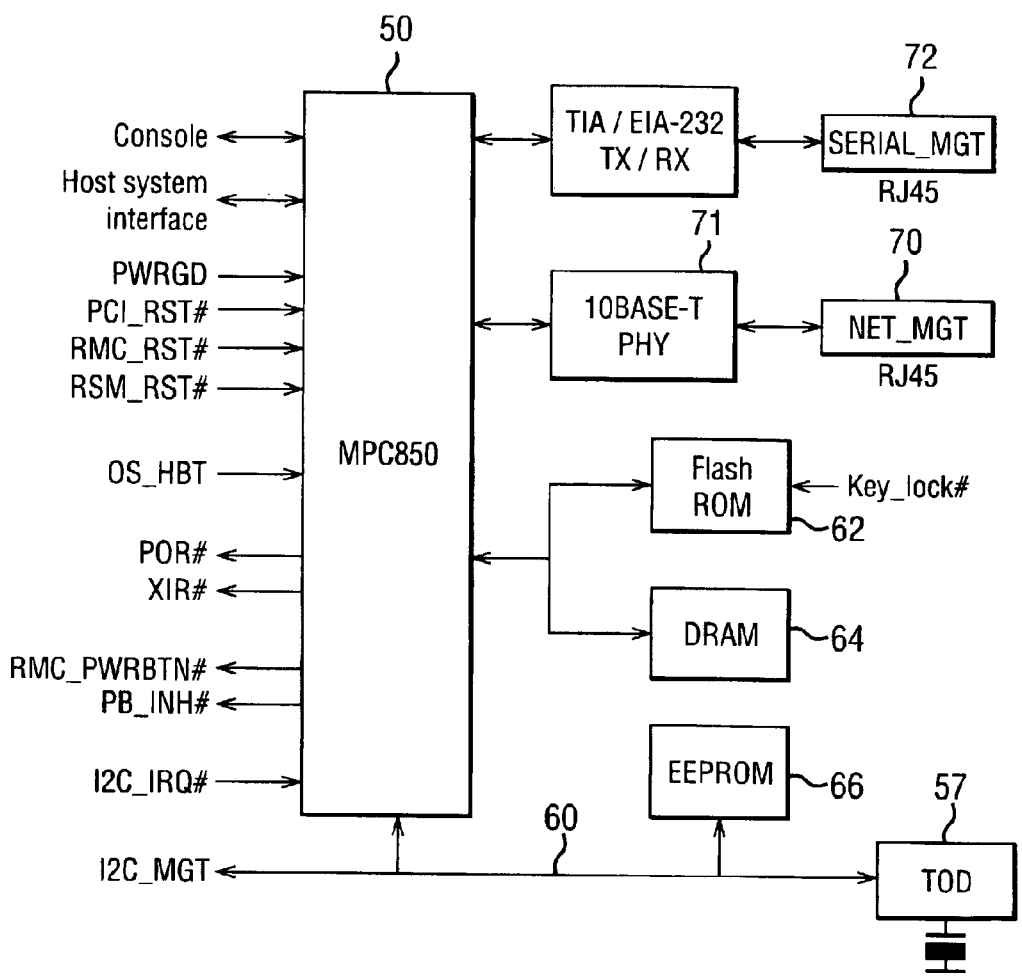
FIG. 3 is a schematic diagram showing the service processor employed in the present invention together with some peripheral components.

Other service functions may be included if desired. The service processor is also responsible for monitoring and reporting the operational status of the system. The processor operates from the +5V rail and is capable of power cycling and resetting of the host system. It is based on an MPC850 PowerPC design with dedicated flash ROM 62 and synchronous dynamic RAM (SDRAM) 64, although any of a number of other processors may be employed. Peripheral devices that are required for the management functions, may include the system configuration card (SCC) reader 20, PCI clock generator 52, general purpose IO (GPIO) devices 54 field replaceable unit identification (FRUID) devices 56, a "time-of-day" real time clock 57, and a system temperature monitor 58. These may be provided by a dedicated IC, in this case an Analogue Devices ADM1026 IC, although others may be used. These devices are provided on an inter-integrated circuit (I2C) management bus 60. As shown in FIG. 3, in addition to the flash ROM and SDRAM, the service controller can access electrically erasable programmable ROM (EEPROM) 66 that is provided in the temperature monitor 58 via the I2C management bus 60.

As well as monitoring the environment and managing the peripheral devices, the service processor can communicate with the PCI I/O device or console interface 44 via serial line 68. User access to the service processor 50 is available either through the 10BASE-T ethernet port 70, (NET_MGT), or through the serial port 72 (SERIAL_MGT). In this way, remote user access is available either to the service processor 50 for management functions, or to the host processor(s) 4 and 6 via the service processor 50. Remote user access, for example by the network administrator, will normally be obtained via the ethernet port 70, while local user access will normally be obtained via the serial port 72.

Figure 4:
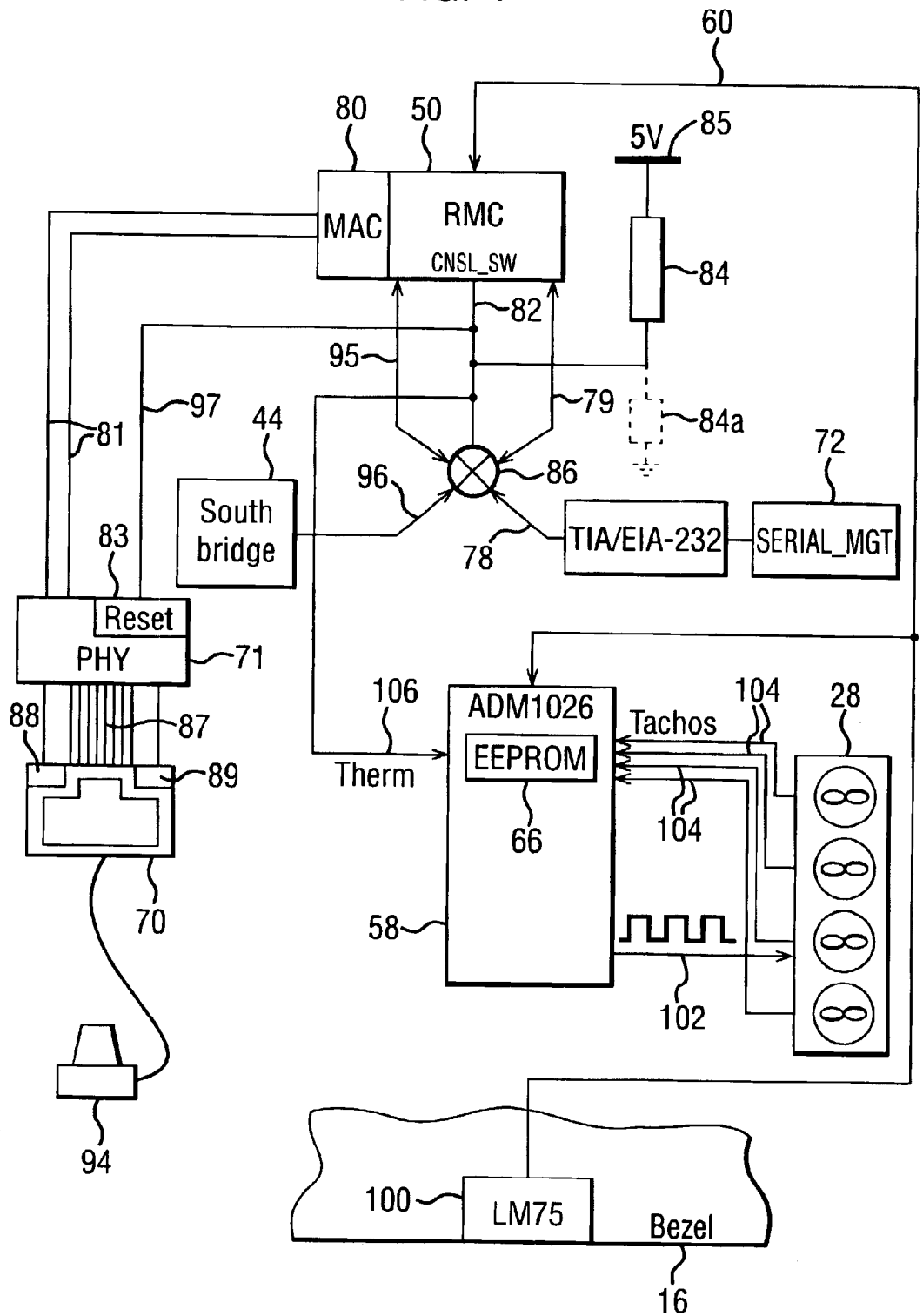
FIG. 4 is a schematic diagram showing the service processor together with various other components of the system including the management communication device.

As shown in FIG. 4, signals from the service processor to the ethernet port 70 are controlled within the service processor by the media access controller 80 which handles the open systems interconnection (OSI) level 2 (data link layer) protocols, and are sent to the ethernet port 70 via a physical lines 81 and a physical interface or PHY 71 which provides power for sending the signals along the ethernet cabling, and provides other functions such as a clock, and line coding. Manchester encoding is employed in this case, but other forms of line coding may be used, that are appropriate to the channel characteristics. A control line 82 (CNSL_SW) extends from the service processor to the reset input 83 of the PHY 71 for the management ethernet port. The control line is also connected to a pull-up resistor 84 connected to the positive 5V rail.

Management data is transmitted between the PHY 71 and the ethernet port 70 by means of an eight conductor cable. In addition, LEDs on the RJ45 socket forming the ethernet port will light up, one LED indicating that the port is operative, and the other LED turning on whenever there is traffic on the line. Other forms of cable may be employed, depending on the form of the ethernet port, and indeed other forms of port may be used.

The control line 82 is also connected to a multiplexer 86 which controls signals between the asynchronous serial port 72 and the host processor I/O device 44.

Figure 5:
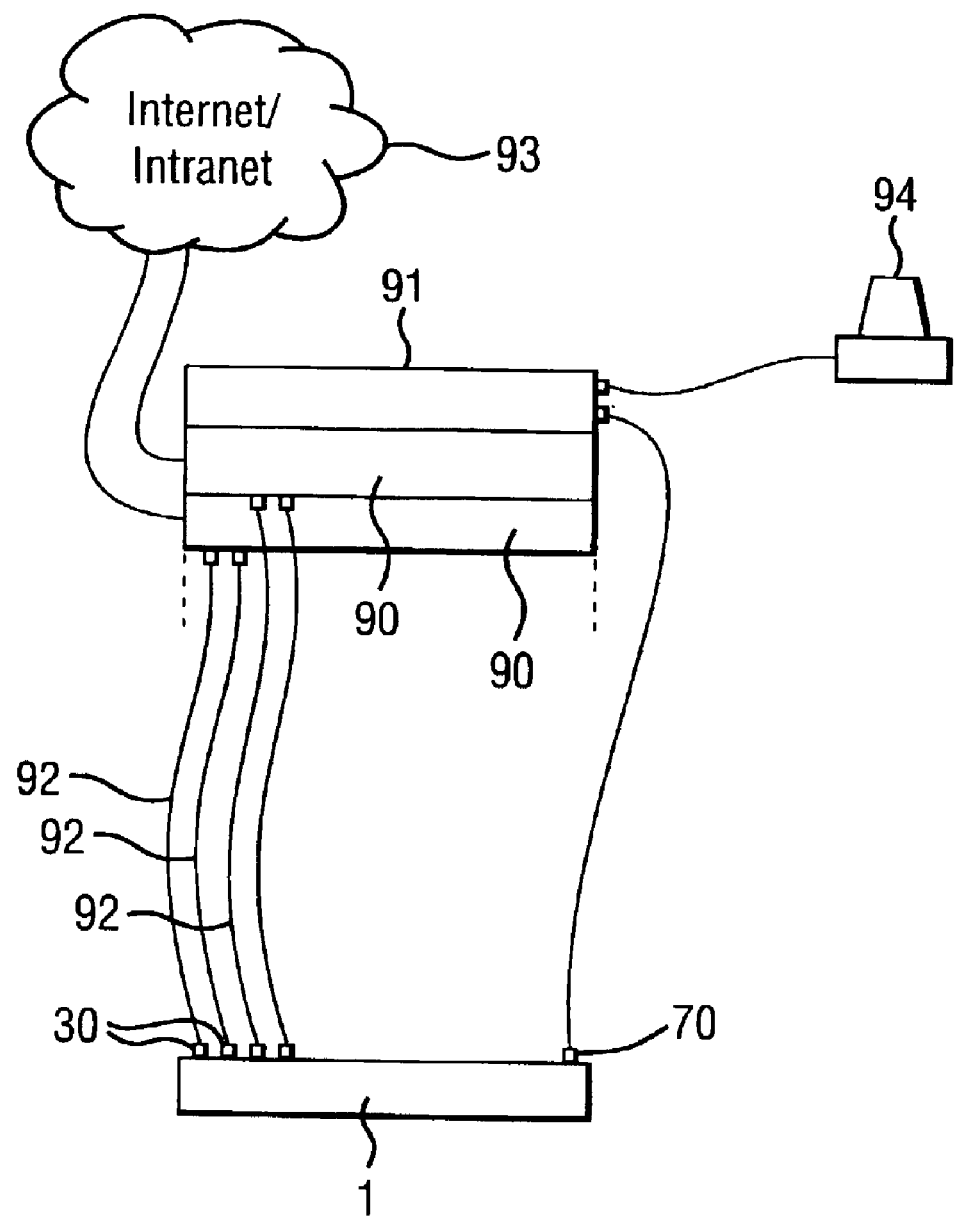
FIG. 5 is a schematic diagram of a server included in a network.

FIG. 5 shows part of a network in which a server 1 communicates with a number of switches 90 by means of ethernet cabling 92 connected to the data ethernet ports 30, the switches 90 then being connected to the internet/intranet 93. In addition, the server 1 is connected to a management switch 91 and thence to the network administrator by means of the management ethernet port 70 connected to the service processor 50.

Under normal operation, data will be transmitted to and from the switches 90 by means of the data ethernet ports 30. At the same time, management data will be transmitted between the server 1 and the network administrator 94 via the management ethernet port 70 and management switch 91. In this mode, the service processor 50 holds the voltage of the control line 82 to earth potential against the pull-up resistor 84.

However, if for any reason the service processor 50 should malfunction, whether this is caused by a hardware fault or a software problem, the control signal from the service processor will be lost and the voltage on the control line 82 will rise to the 5V rail voltage due to the pull-up resistor 84. This voltage will be led into the reset input 84 of the management ethernet port PHY 71 and switch the PHY off. Turning the PHY 71 off will cause the network administrator 94 to become aware of the malfunction since it will not be possible to send or receive management data to or from the server 1. In addition, any user who inspects the server will be able to see that the LEDs 88 and 89 are turned off. In addition, if the service processor fails, interference from the host processors 4 and 6, which are still operating, will not be picked up by the lines 81, amplified and coded by the PHY 71 and sent along the network ethernet lines 92, thereby causing interference in other parts of the network.

At the same time as the PHY 71 is turned off, the change in voltage on the control line 82 will cause the multiplexer 86 to stop sending data from the serial port 72 to the service processor 50, and instead bypass the service processor so that the data are sent directly between the UART 72 and the host processor PC I/O device 44. A user may still be able to access the host processors via the serial port 72 since the service processor will be bypassed.

As well as controlling the reset input 83 of PHY 71 and transfer of data between the serial port 72 and the PC I/O device 44, the control line 82 may also be connected to the thermal reset input (THERM) 106 of the temperature monitor 58. The temperature monitor 58 sends a pulse width modulated fan control signal to the fans 28 along line 102 in response to a fan speed setting provided by the service processor 50 via the I2C line 60. If the service processor 50 malfunctions the voltage on the control line 82 will rise causing the temperature monitor to run the fans 28 at maximum speed in order to ensure adequate cooling of the enclosure until the service processor fault has been rectified.

As an alternative to the pull-up resistor 84, a pull-down resistor 84a may be employed that is connected between the control line 82 and earth. In this case the service processor 50 would hold the control line 82 at same voltage level unless it failed in which case the control line voltage would fall to earth potential.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims can be formulated to such features during prosecution of this application or of any such further application derived therefrom. In particular, with reference to the appended claims, features from dependent claims can be combined with those of the independent claims and features from respective independent claims can be combined in any appropriate manner and not merely in the specific combinations enumerated in the claims.

What is claimed is:

1. A computer system which comprises:
   (i) a host processor;
   (ii) a service processor for providing system management functions within the computer system; and
   (iii) one or more external communication devices, the external communication devices including at least one management communication device that communicates with the service processor;
   wherein the management communication device is controlled by a signal from the service processor and is operative to send and receive data only when it receives the signal from the service processor.

2. A system as claimed in claim 1, wherein the management communication device is controlled by a voltage level that is supplied by the service processor.

3. A system as claimed in claim 2, wherein the management communication device is also controlled by a pull-up or pull-down resistor, so that the device will become inoperative if it receives a voltage that is governed by the pull-up or pull-down resistor.

4. A system as claimed in claim 1, wherein the management communication device is an ethernet port.

5. A system as claimed in claim 1, wherein the management communication device includes a physical interface that provides power for signals sent from the management communication device.

6. A system as claimed in claim 5, wherein the signal from the service processor is sent to a reset input of the physical interface to cause the physical interface to become inoperative if the service processor malfunctions.

7. A system as claimed in claim 1, wherein the management communication device includes an indicator for indicating whether or not a communication link is established and/or whether or not traffic is being sent or received which indicator is quiesced when the management communication device is inoperative.

8. A system as claimed in claim 1, which includes additional external communication devices that are controlled by the or each host processor.

9. A system as claimed in claim 8, wherein the additional external communication devices are ethernet ports.

10. A system as claimed in claim 1, which includes a switching device that enables the service processor to communicate with the or at least one host processor only when the switching device receives the signal from the service processor to enable a user to communicate with the or at least one host processor via the service processor.

11. A system as claimed in claim 10, wherein the switching device will bypass the service processor when the signal is not received from the service processor.

12. A system as claimed in claim 1, wherein the service processor provides one or more of the following system functions:
   1) power management control,
   2) environmental monitoring,
   3) enclosure management and event logging
   4) fan control,
   5) voltage rail monitoring, and
   6) system status monitoring.

13. A system as claimed in claim 1, which is a computer server.

14. A network which includes at least one computer server comprising:
   (i) a host processor;
   (ii) a service processor for providing system management functions within the computer system; and
   (iii) one or more external communication devices, the external communication devices including at least one management communication device that communicates with the service processor and with a network administrator;
   wherein the management communication device is controlled by a signal from the service processor and is operative to transfer data only when it receives the signal from the service processor.

15. A network as claimed in claim 14, in which the server communicates with a publicly accessible network via external communication devices other than the management communication device.

16. A method of operating a network which includes at least one computer server comprising:
   (i) a host processor;
   (ii) a service processor for providing system management functions within the computer system; and
   (iii) one or more external communication devices, the external communication devices including at least one management communication device that communicates with the service processor and with a network administrator;
   the management communication device being controlled by a signal from the service processor and being operative to send and receive data only when it receives the signal from the service processor, which method comprises monitoring traffic from the management communication device and effecting repair or replacement of the service processor or of the server in the event of loss of traffic from the management communication device.

* * * * *